United States Patent [19]

Kregness

[11] 4,039,813
[45] Aug. 2, 1977

[54] APPARATUS AND METHOD FOR DIAGNOSING DIGITAL DATA DEVICES

[75] Inventor: Glen Roy Kregness, Hopkins, Minn.

[73] Assignee: Sperry Rand Corporation, New York, N.Y.

[21] Appl. No.: 674,712

[22] Filed: Apr. 7, 1976

[51] Int. Cl.² .................. G06F 11/04; H03K 5/18
[52] U.S. Cl. .................. 235/153 AC; 235/153 AK
[58] Field of Search .............. 235/153 AC, 153 AK; 340/172.5

[56] References Cited

U.S. PATENT DOCUMENTS 3,988,579  10/1976  Bottard et al. ............... 235/153 AK Primary Examiner—R. Stephen Dildine, Jr.
Attorney, Agent, or Firm—William D. Bauer; Thomas J. Nikolai; Marshall A. Truex

[57] ABSTRACT

A self-test monitor and diagnostic apparatus which includes a test step counter, an error comparator apparatus, which may be a memory device loaded so as to predict the proper state of each of the lines to be monitored at each test step and which functions to detect any difference between what should be occurring at that test step and what is, in fact, occurring on the monitored line, and an error localization network which translates the detected errors into a displayable code for maintenance isolation.

16 Claims, 1 Drawing Figure

APPARATUS AND METHOD FOR DIAGNOSING DIGITAL DATA DEVICES

BACKGROUND OF THE INVENTION

The present invention relates to a method and an apparatus for detecting and diagnosing functional hardware errors in certain logic signals produced in digital data processing devices. This self-test monitor and diagnostic apparatus has been developed to detect and isolate hardware failures occurring in the "hard core" logic areas of the digital data processing device so that diagnostic routines may be run with a confidence level sufficient to insure that hardware errors can be program detected and indicated to an operator.

Computer maintainability, error detection and fault isolation have become major goals of the system designer of digital data processing devices. In a digital data processing device which is microprogrammed, one tool available to the designer is a set of microdiagnostic programs. Because microprogramming constitutes programming that can control the logic of the computing machine, it is possible to use such microdiagnostic programs to detect and isolate failures to a small number of hardware modules. However, a failure in a "hard core" area of logic, i.e., an area of the logic which if faulty makes impossible the running of even a microdiagnostic program; the maintenance technician must resort to traditional "brute force" methods to locate the cause of the failure. Unfortunately, many single failures in a digital data processing device may cause the inability to run even a simple diagnostic program. Additionally, if simple programs cannot be run there exists no practical way of indicating a failure to the operator. It therefore becomes necessary to devise a method to detect and isolate failures occurring in this "hard core" area so that diagnostic routines may be run with enough confidence that the device is sufficiently operable so that program detection can be utilized and to indicate fault location to an operator.

SUMMARY OF THE INVENTION

Functional hardware errors in a digital data processing device, which may not be diagnosed by conventional programming means, may be diagnosed with an apparatus consisting of a counter means for counting a predetermined test step sequence, which counter means produces binary output signals indicative of such steps; a memory means for storing predetermined code words indicative of diagnostic data at addressable storage locations therein; and address generating means coupled to receive the binary output signals from the counter means and the logic signals being diagnosed for generating an address utilized by the memory means for accessing the predetermined code words.

The diagnostic apparatus may consist of a counter for counting the test steps with the output of the counter connected, along with selected signals from that logic which is being diagnosed, to the address inputs of a read only memory. Since the test steps are known and the state of the logic signals from the logic hardware being diagnosed are known at each given test step, the particular address location in the read only memory which should be addressed for each test step is also known. A code word may be inserted in the read only memory at those locations which are indicative of a proper state of all signals under test. If any of the signals under test do not have the proper state for the given test step, a different location in the read only memory will be accessed. At this different location in the read only memory is stored a diagnostic code word indicating a hardware failure and containing information relative to which hardware module has failed. In this manner, the read only memory performs the functions of predicting the proper state of each of the signals under test, comparing the current state of the signals under test with the predicted state of the signals under test at each given step of the test step sequence, and providing to an error localization network a diagnostic code word, which code word may be translated into a displayable code for maintenance isolation. A test state register may be inserted between the address inputs of the read only memory and the actual signals under test in order to provide for stability of information while the compare operation is performed.

OBJECTS

It is an object of the present invention to provide an apparatus for detecting functional hardware errors in certain logic signals in a digital data processing device.

It is another object of the present invention to provide an apparatus for determining which physical hardware module is at fault for functional errors in certain logic signals produced in a digital data processing device.

It is a further object of the present invention to provide an apparatus for diagnosing functional hardware errors in certain logic signals produced in a digital data processing device in those basic areas of logic which, if faulty, would prevent the running of conventional programmed diagnostic tools.

It is a still further object of the present invention to provide a method for diagnosing computer hardware errors among certain logic signals in a computer of the type having a program address counter and a plurality of hardware modules which consists of the steps of performing a test step sequence by executing a known set of test step microinstructions in a sequential manner, counting each step in the test step sequence, holding the state of each of the certain logic signals at each step of the test step sequence, addressing a read only memory containing a code in the storage locations representing appropriate diagnostic information with both the count of the step in the test step sequence and with the state of the certain logic signals being held, reading the contents of the storage locations in the memory and presenting the contents read for external inspection.

BRIEF DESCRIPTION OF THE DRAWING

The foregoing objects, advantages, construction and operation of the present invention will become more readily apparent from the following description and accompanying drawing which shows a schematic block diagram of the self-test hardware.

DESCRIPTION OF THE PREFERRED EMBODIMENT

Figure 1:
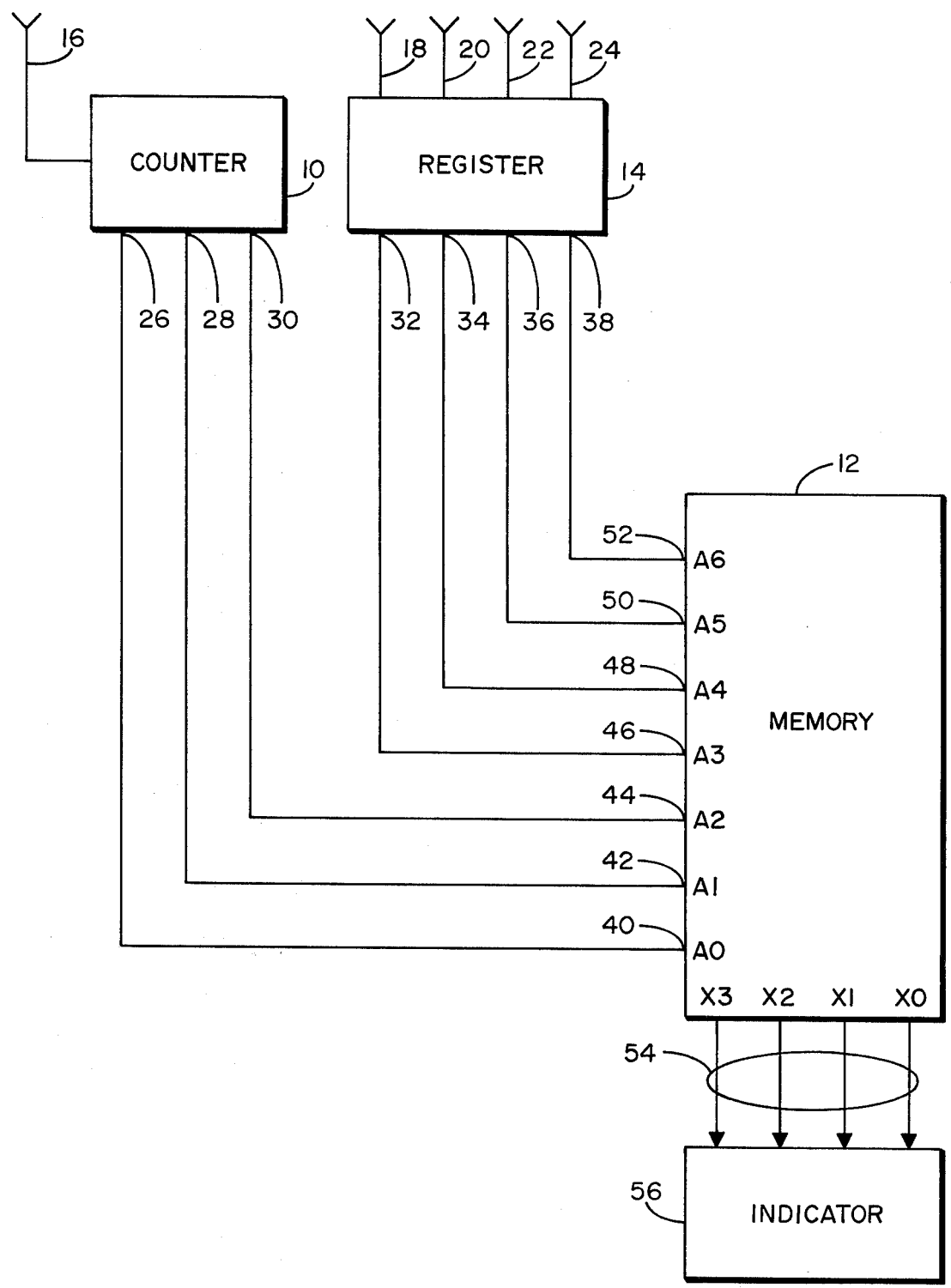

In order to test logic in a digital data processor, which if inoperable would prevent the proper execution of normal diagnostic or microdiagnostic programs, a set of self-test monitor hardware has been developed. Most computing machines have a "Master Clear" control, which when operated serves to initialize the various registers and flip-flops to a predetermined state. The self-test monitor hardware starts from a "Master Clear" initialized operation and first operates to validate that logic circuitry controlled by the Master Clear to determine whether it has been correctly set or cleared. It also determines whether the device clock is functioning and whether erroneous controls are present which might cause the inability to sequence and execute instructions or microinstructions.

The principal elements making up the self-test monitor logic are:
1. a counter, which is indexed by one for each test step execution time;
2. a step syndrome generator programmed to predict proper state of each of the lines to be monitored at each step;
3. an error comparator which detects any difference between the syndrome mask and the monitored line; and
4. an error localization network which translates the detected error into a displayable code for maintenance isolation.

In implementing the self-test monitor logic the function of the last three elements, i.e., the step syndrome generator, the error comparator and the error localization network, are all performed by a single memory device as will be more fully illustrated. This memory device, which may be a read only memory device, through its addressing, decodes the combined step count with the monitored information to determine if the proper state of the monitored information is present. If the states are correct, the memory device outputs a zero code, or any other predetermined diagnostic code desired. In the event of a functional hardware error, the memory device outputs a non-zero code, or other predetermined diagnostic code desired, defining the category of failure and the step on which it occurred.

The self-test monitor logic, apparatus for diagnosing functional hardware errors in certain logic signals produced in a digital data processing device, can be used to validate the state of any logic signal within the digital data processing device. However, the most advantageous use of this monitor logic is achieved when the logic is used to validate the state of those logic signals which, if inoperable, would prevent conventional programmed or microprogrammed diagnostics from operating. Thus, for purposes of this invention any logic signals may be used as inputs for monitored information, i.e., the certain logic signals in the data processing device which are to be diagnosed. It is suggested, however, that basic "hard core" control hardware signals be utilized, as a failure in one of these signals would most certainly prevent proper execution of a program of microprogram. Examples of these certain logic signals are:
1. "Master Clear", "Power-up Clear" or other initialization signals;
2. basic clocking signals generated by the digital data processor;
3. general arithmetic output signals such as a signal indicating that the output of the arithmetic logic unit is zero;
4. a signal indicating that a basic communication bus within the digital data processor is zero or non-zero;
5. critical status or microstatus signals.

Note that these signals are exemplary only and any appropriate signal within the digital data processing device may be utilized without detracting from the proper operation of the present invention.

Referring to the FIGURE, the basic elements of the selftest monitor logic can be seen. The three basic elements illustrated in this block diagram are a test state counter 10, a memory 12 and a register 14. Even the register 14 is not needed if the state of the certain logic signals under validation are sufficiently stable.

The test state counter 10, is utilized for counting the basic steps involved in a test step sequence. The number of bits present in the test state counter 10 is flexible and depends only upon the number of separate test steps needed to fully evaluate the certain logic signals being validated. In this illustration, a three-bit counter capable of defining eight separate test steps has been chosen. However, limitation to a three-bit counter is not intended and should not be inferred. The test state counter 10 is enabled by a single "Enable Count" control signal applied to line 16. The Enable Count originates in the digital data processor under test (e.g., the initiation of the Master Clear sequence in the digital data processor) and is merely used to initiate the test step sequence.

The memory device 12 is utilized to store predetermined diagnostic code words at addressable locations. Since these diagnostic code words are fixed for any given set of certain logic signals being validated and test steps, a read-only type and any general type of random access memory device may be utilized for this purpose. The memory 12 contains sufficient addressing logic in order to address a unique memory location for each unique combination of address signals input to the memory 12. The addressing structure in the memory 12 must be large enough to accomodate the combined addressing lines from the test state counter 10 and the certain logic signals being validated. For this illustration in the figure, a total of seven address inputs are required and are identified by numerals 40 – 52. This requires a memory 12 having $2^7$ or $128_{10}$ unique memory locations. Each unique memory location within the memory 12 is prearranged to store a diagnostic code word. The number of bits in the diagnostic code word, and hence in the memory, is completely dependent upon the complexity and definition of the diagnostic code word. In one extreme case a single bit code word code word could be utilized to indicate either no hardware error or the existence of a hardware error. In other cases the code word will contain more bits, such that the code word will indicate no hardware error or the existence of a hardware error and an identification of which hardware module is at fault. The memory 12 also contains a sufficient number of outputs of reading the diagnostic code word from the unique memory location specified by the address lines 40 – 52. These outputs are identified collectively by numeral 54. In this example, four lines are illustrated which correspond to a diagnostic code word of four bits.

The test state register 14, as previously mentioned, is necessary only to hold for stability purposes the state of the certain logic signals that are being validated. The test state register 14 contains at least the number of bits as the number of certain logic signals being validated. In this illustration, four such logic signals are shown and the test state register 14 also is capable of holding four bits. The test state register 14 receives the state of the certain logic signals being validated directly from the digital data processor (not shown) by way of lines 18, 20, 22 and 24. The four output lines 32, 34, 36 and 38 from the test state register 14 represent the stabilized state of the logic signals being validated and are connected directly to four of the address input lines 46, 48, 50 and 52 of the memory 12. The three output lines 26, 28 and 30 from the test state counter 10 are connected to the remaining three address inputs 40, 42 and 44 of the memory 12. Thus, the combined bits of the test state counter 10 and the test state register 14 serve to address the memory 12.

Note that the combined addressing of the output of the test state counter 10 and the test state reigster 14 serve to address a unique memory location in the memory 12 for every possible combination of test steps and state of the certain logic signals being validated. Since the proper state of the certain logic signals being validated within the digital data processor are known, the state of each of the certain logic signals 18 – 24 is known for all of the test states counted by the test state counter 10. Thus, it is easy to predict the proper state of the address inputs 46 – 52 of the memory 12 for each test state as determined by the test state counter 10.

As the test state counter 10 is sequenced, if the logic being validated is operating properly, only certain locations in the memory 12 will be accessed. This is illustrated in Table I. The columns labeled 26, 28 and 30 in Table I represent the state of the test state counter 10 and the columns labeled 32, 34, 36 and 38 represent the proper state of the lines being validated. As the test state is sequenced different addresses in the memory 12 are accessed. For example, test state 0 corresponds to octal address 005; test state 1 to address 027; test state 2 to address 044; test state 3 to address 063; test state 4 to address 103; test state 5 to address 130; test state 6 to address 146; and finally, test state 7 to address 174. A proper diagnostic code indicating no hardware functional error may be inserted in the memory 12 at those address locations. If any of the logic signals being validated are in error, the address inputs 32, 34, 36 and 38 to the memory 12 will also be in error for a given test state. If this is true, a different address in the memory 12 would be accessed. As for example, for test state 0 if addressing input 32 were in error and were a binary 1 instead of the binary 0 shown in Table I, the memory 12 address access would be address $15_8$ instead of address $5_8$. Thus, at location $15_8$ in the memory 12 a diagnostic code word could be inserted to indicate that the data processing device hardware has malfunctioned and, if desired, which hardware module malfunctioned. Note that the only way memory address $15_8$ may be accessed is if a hardware error in either the digital data processing device or the self-test monitor logic has occurred.

TABLE I

| TEST STATE | COUNTER | | | | | | | ROM ADDRESS (OCTAL) |
|---|---|---|---|---|---|---|---|---|
| | 26 | 28 | 30 | 32 | 34 | 36 | 38 | |
| 0 | 0 | 0 | 0 | 0 | 1 | 0 | 1 | 005 |
| 1 | 0 | 0 | 1 | 0 | 1 | 1 | 1 | 027 |
| 2 | 0 | 1 | 0 | 0 | 1 | 0 | 0 | 044 |
| 3 | 0 | 1 | 1 | 0 | 0 | 1 | 1 | 063 |
| 4 | 1 | 0 | 0 | 0 | 0 | 1 | 1 | 103 |
| 5 | 1 | 0 | 1 | 1 | 0 | 0 | 0 | 130 |
| 6 | 1 | 1 | 0 | 0 | 1 | 1 | 0 | 146 |
| 7 | 1 | 1 | 1 | 1 | 1 | 0 | 0 | 174 |

Although any sort of diagnostic code word may be utilized, starting with a one-bit code and proceeding upwards in complexity, a specific diagnostic code has been chosen for illustrative purposes in Table II. A four-bit code has been chosen to represent an error in one of the four logic signals being validated. A code word of all zeros indicates no error in the logic signal being validated and that the digital data processing device from whence these signals emanated is operating properly. A non-zero diagnostic code indicates a functional hardware error in one of the logic signals being validated. Further, the bit location of the non-zero bit in the diagnostic code word corresponds to the logic signal failing. For example, a code of 0001 would indicate a failure of logic signal 24, a code of 0010 would indicate a failure of logic signal 22, a code of 0100 would indicate a failure of logic signal 20 and a code of 1000 would indicate a failure of logic signal 18. Of course multiple logic signals may fail and this is illustrated in the code by multiple non-zero bits. It is emphasized that any diagnostic code desired may be utilized and this particular code is illustrated for exemplary purposes only.

Table II illustrates an illustrative coding of the memory 12 for a given set of diagnostic codes. As noted previously, memory addresses 5, 27, 44, 63, 103, 130, 146 and 174 (octal) indicate the proper functioning of the logic signals being validated. Accordingly, the diagnostic code at those locations is 0. Also note that different blocks of memory are accessed for each test step. For test step 0 the possible memory addresses accessed are $0 - 17_8$; for test step 1, $20_8 - 37_8$; for test step 2, $40_8 - 57_8$; etc. For purposes of illustration, the complete coding of the memory 12 will be illustrated only for test step 0, i.e., memory addresses $0 - 17_8$.

TABLE II

| ADDRESS | CODE | ADDRESS | CODE | ADDRESS | CODE |
|---|---|---|---|---|---|
| 000 | 0101 | 060 | | 140 | |
| 001 | 0100 | 061 | | 141 | |
| 002 | 0111 | 062 | | 142 | |
| 003 | 0110 | 063 | 0000 | 143 | |
| 004 | 0001 | 064 | | 144 | |
| 005 | 0000 | 065 | | 145 | |
| 006 | 0011 | 066 | | 146 | 0000 |
| 007 | 0010 | 067 | | 147 | |
| 010 | 1101 | 070 | | 150 | |
| 011 | 1100 | 071 | | 151 | |
| 012 | 1111 | 072 | | 152 | |
| 013 | 1110 | 073 | | 153 | |
| 014 | 1001 | 074 | | 154 | |
| 015 | 1000 | 075 | | 155 | |
| 016 | 1011 | 076 | | 156 | |
| 017 | 1010 | 077 | | 157 | |
| 020 | | 100 | | 160 | |
| 021 | | 101 | | 161 | |
| 022 | | 102 | | 162 | |
| 023 | | 103 | 0000 | 163 | |
| 024 | | 104 | | 164 | |
| 025 | | 105 | | 165 | |
| 026 | | 106 | | 166 | |
| 027 | 0000 | 107 | | 167 | |
| 030 | | 110 | | 170 | |
| 031 | | 111 | | 171 | |
| 032 | | 112 | | 172 | |
| 033 | | 113 | | 173 | |
| 034 | | 114 | | 174 | 0000 |
| 035 | | 115 | | 175 | |
| 036 | | 116 | | 176 | |
| 037 | | 117 | | 177 | |
| 040 | | 120 | | | |
| 041 | | 121 | | | |
| 042 | | 122 | | | |
| 043 | | 123 | | | |
| 044 | 0000 | 124 | | | |
| 045 | | 125 | | | |
| 046 | | 126 | | | |
| 047 | | 127 | | | |
| 050 | | 130 | 0000 | | |
| 051 | | 131 | | | |
| 052 | | 132 | | | |
| 053 | | 133 | | | |
| 054 | | 134 | | | |
| 055 | | 135 | | | |
| 056 | | 136 | | | |
| 057 | | 137 | | | |

As previously noted, within the block of memory addresses $0 - 17_8$ only one (memory address $5_8$) represents the proper functioning of the logic signals. Thus, it is the only location within that block to contain the diagnostic code of 0000. All other address locations within that block represent a single or multiple failure among the logic signals being validated. For example, the failure of the logic signal on line 24 would result in memory address $4_8$ being selected and the appropriate diagnostic code 0001 is contained therein. The failure of logic signal on line 18 would result in the addressing of memory address $15_8$ and the appropriate diagnostic code of 1000. Note that if a multiple failure among the logic signals occurred and both of the logic signals on lines 18 and 24 were in error, memory location $14_8$ would be accessed and the appropriate diagnostic code 1001 contained therein would be read out. The assigning of the diagnostic codes for the other memory locations within this block should be self-evident. The assigning of diagnostic codes for memory locations in the other blocks follows a corresponding system. The addressing is changed only due to a different test step and different known predicted state of the certain logic signals being validated.

The diagnostic code output resulting on lines 54 from the memory 12 is then supplied externally to an operator by suitable indicating means 56. This indicating means 56, of course, may take many forms including the mere display of the four-bit diagnostic code to the operator, possibly along with the test step and the current state of the test state register 14. Of course, many other forms of indicating means 56 are contemplated and may be utilized if desired.

In a digital data processing device of the type having a microprocessor including a microprogram address register, the state of the digital data processing device may be changed merely by executing a series of microinstructions. These series of microinstructions could, in fact, form the basis for a test step sequence with each new microinstruction representing a new operation in the test step sequence. The microprogram address register would increment or change for every new microinstruction and, hence, for every new test step. Thus, the microprogram address register may be made to perform the same function as the test step counter 10 illustrated in FIG. 1. In this environment, the self-test monitor logic previously described may be utilized with the same success as in other environments. However, since the microprogram address register performs the same function as the test state counter 10 in keeping track of each test step in the test step sequence, the test step counter 10 as a separate unit may be eliminated provided that logic checking of the microprogram address counter is provided to insure proper incrementation. The memory 12 may then be addressed directly from the microprogram address register, if desired. Where an additional logic check of the microprogram address counter is not provided, care must be exercised since the separate test counter serves as a check on the incrementing of the microprogram address counter since if the test step counter advances but the microprogram address counter does not advance, an improper microinstruction for that step would be accessed and cause an error condition to occur.

There also may be environments and digital data processing devices in which it would be desirable to utilize the device's microprogrammed address register as a partial definition of the test step sequenced and utilize a separate test step counter along with the microprogram address register to completely define the test step sequence. In this case, both the microprogram address register and the separate test step counter could be utilized to form the addressing means for the memory 12.

If both a separate test step counter and microprogram address register are utilized to address the memory 12, the test step counter may be utilized to check basic critical signals at the initialization time of the machine and after the test step counter has completed its counting function, the microprogram address register could continue changing the steps in the test step sequence. If this were true, the beginning steps in the test step sequence could be utilized to test and isolate small logic areas of the machine to determine whether proper operation results. Each successive step following in the test step sequence could then expand the area of test so that isolation of any fault could be made to a small area of machine logic circuitry.

The hardware described so far has illustrated a method for diagnosing computer hardware errors among the certain logic signals being validated which consists of the following steps:

1. performing a test step sequence either by executing a known set of test step microinstructions in a sequential manner or by other sequential controlling means;
2. counting each step in the test step sequence either with the microprogram address register, a separate test step counter or a combination of the two;
3. holding the state of each of the certain logic signals being validated at each step of the test step sequence either through the logic signals' own inherent stability or through a distinct test state register;
4. addressing a memory, which could be a read only memory, with both the count of the step in the test step sequence and with the state of the certain logic signals, the memory containing a code in the storage locations representing appropriate diagnostic information;
5. reading the contents of the storage locations in the memory; and
6. presenting the contents read for external inspection. Note that the functions of steps 3 through 6 are all performed in the described apparatus by the memory device containing sufficient addressing means to uniquely specify a single unique memory location from a given input of address bits.

Thus, it can be seen that there has been shown and described a novel apparatus for diagnosing functional hardware errors in certain logic signals produced in a digital data processing device. It is to be understood, however, that various changes, modifications and substitutions in the form and details of the described apparatus and method can be made by anyone skilled in the art without departing from the scope of the invention as defined by the following claims:

What is claimed is:

1. In a digital data processing device, apparatus for diagnosing functional hardware errors in certain logic signals produced therein, comprising:
   a. counter means for counting a predetermined test step sequence and producing binary output signals indicative of such steps;
   b. memory means for storing predetermined code words indicative of diagnostic data at addressable storage locations therein; and
   c. address generating means coupled to receive said binary output signals from said counter means and said certain logic signals for generating an address utilized by said memory means for accessing said predetermined code words.

2. An apparatus as in claim 1 wherein the memory is a read only memory.

3. An apparatus as in claim 2 which further includes a means for holding the state of said certain logic signals, said means for holding being connected between said certain logic signals and said address generating means.

4. An apparatus as in claim 3 for use in said digital data processing device of the type having a program address counter, wherein said means for counting comprises a counter independent from said program address counter.

5. An apparatus as in claim 3 wherein the means for holding comprises a register having a bit position for each of the said certain logic signals.

6. An apparatus as in claim 3 wherein said predetermined code words comprise a single bit indicating whether an error is present in said digital data processing device.

7. An apparatus as in claim 3 for use in said digital data processing device of the type having a plurality of hardware modules, wherein said code words comprise a multibit code indicating whether an error is present in said digital data processing device and, if so, which hardware module is at fault.

8. An apparatus as in claim 7 which further includes a means responsive to said code word for indicating which said hardware module is at fault, said means for indicating connected to the output of said memory means.

9. In a computer of the type having a microprocessor for performing computations in accordance with a stored program of instructions, a microprogram address counter, and a plurality of hardware modules, an apparatus for diagnosing computer hardware errors among certain logic signals, comprising:
   a. means for counting a predetermined test step sequence; and
   b. a memory having a plurality of addressable storage locations containing a predetermined code in the storage locations representing appropriate diagnostic information, said memory being addressed by said means for counting and by said certain logic signals, and an output for reading the contents of the storage locations.

10. An apparatus as in claim 9 wherein said memory is a read only memory.

11. An apparatus as in claim 10 which further includes a means for holding the state of said certain logic signals, said means for holding being connected between said certain logic signals and said address generating means.

12. An apparatus as in claim 11 wherein said means for counting is the microprogram address counter.

13. An apparatus as in claim 11 wherein said means for counting comprises a counter independent from the microprogram address counter.

14. An apparatus as in claim 11 wherein said test steps are microinstruction executions and said test step sequence is a sequence of microinstruction executions.

15. An apparatus as in claim 14 wherein said certain logic signals include logic signals of said digital data devices which, if in error, would prevent microinstruction execution and sequencing.

16. In a computer of the type having a program address counter and a plurality of hardware modules, a method for diagnosing computer hardware errors among certain logic signals, comprising the steps of:
   a. performing a test step sequence by executing a known set of test step microinstructions in a sequential manner;
   b. counting each step in the test step sequence;
   c. holding the state of each of the certain logic signals at each step of the test step sequence;
   d. addressing a read only memory containing a code in the storage locations representing appropriate diagnostic information with both the count of the step in the test step sequence and with the state of the certain logic signals being held;
   e. reading the contents of the storage locations in the memory; and
   f. presenting the contents read for an external inspection.

* * * * *